(12) United States Patent
Siebers et al.

(10) Patent No.: US 8,183,707 B2
(45) Date of Patent: May 22, 2012

(54) METHOD OF CONTROLLING A WIND ENERGY SYSTEM AND WIND SPEED SENSOR FREE WIND ENERGY SYSTEM

(75) Inventors: Thomas Siebers, Neuenkirchen (DE); Henk-Jan Kooijman, Enschede (NL)

(73) Assignee: General Electric Company, Schenectady, NY (US)

( * ) Notice: Subject to any disclaimer, the term of this patent is extended or adjusted under 35 U.S.C. 154(b) by 1089 days.

(21) Appl. No.: 11/929,273

(22) Filed: Oct. 30, 2007

(65) Prior Publication Data
US 2009/0108582 A1 Apr. 30, 2009

(51) Int. Cl.
*F03B 13/00* (2006.01)

(52) U.S. Cl. .............. 290/53; 290/44; 290/45

(58) Field of Classification Search .......... 290/53, 290/54, 44, 55
See application file for complete search history.

(56) References Cited

U.S. PATENT DOCUMENTS

| | | | | |
|---|---|---|---|---|
| 5,289,041 | A * | 2/1994 | Holley | 290/44 |
| 6,441,507 | B1 * | 8/2002 | Deering et al. | 290/44 |
| 7,095,131 | B2 * | 8/2006 | Mikhail et al. | 290/44 |
| 7,259,471 | B2 * | 8/2007 | Basteck | 290/43 |

* cited by examiner

*Primary Examiner* — Tulsidas C Patel
*Assistant Examiner* — Iraj A Mohandesi
(74) *Attorney, Agent, or Firm* — Global Patent Operation; Douglas D. Zhang

(57) ABSTRACT

A method for controlling a wind energy system is provided wherein the method comprises determining the effective wind speed taking into account the load on the rotor blades of said wind energy system exerted by the wind is provided. A computer-readable medium is provided that provides instructions which when executed by a computing platform cause the computing platform to perform operations wherein the operations include the method according to embodiments described herein. Further, a wind energy system having a calculation unit adapted for calculating the effective wind speed by taking into account the load on the rotor blades of said wind energy system exerted by the wind is provided. Further, a wind speed sensor free wind energy system having a generator for generating electric energy and a controller for shutting down and/or starting the electric energy generation in dependence of the wind speed is provided.

16 Claims, 5 Drawing Sheets

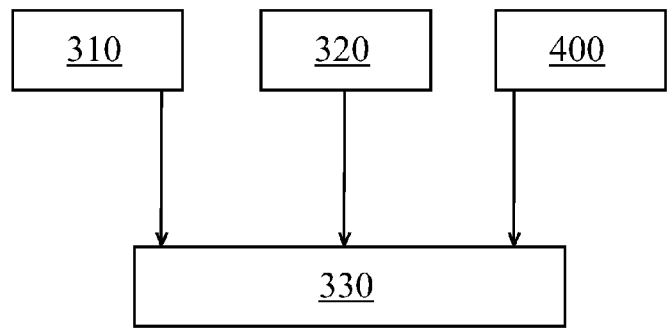
Fig. 4A
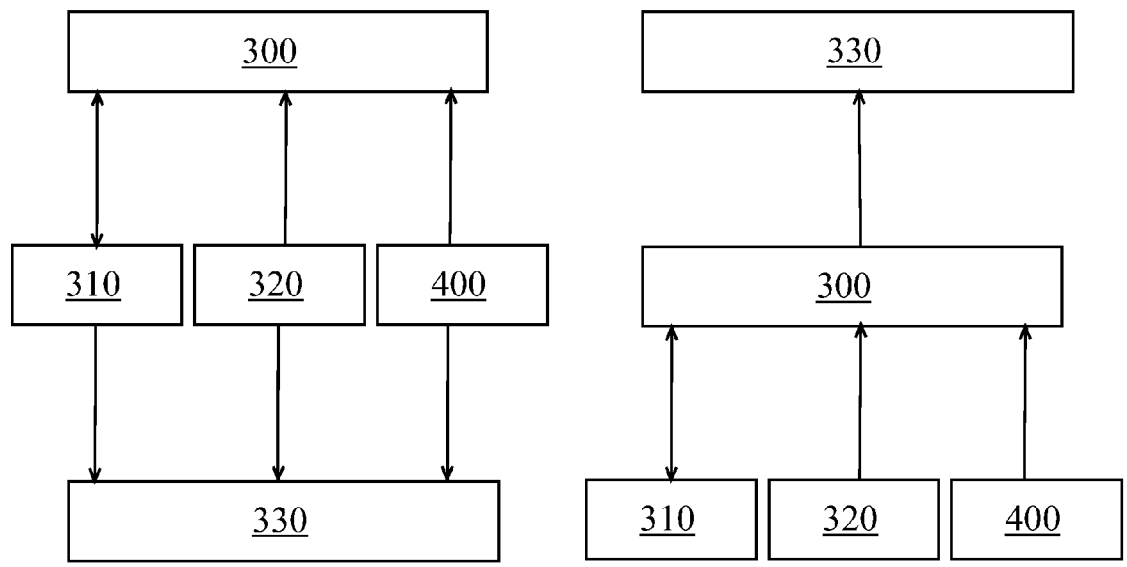
Fig. 4B
Fig. 4C

METHOD OF CONTROLLING A WIND ENERGY SYSTEM AND WIND SPEED SENSOR FREE WIND ENERGY SYSTEM

BACKGROUND OF THE INVENTION

The present invention relates to a wind energy system and a method of operating and, in particular, controlling a wind energy system. In particular, the present invention relates to a method of determining the correct operational condition of a wind energy system.

It is known that the operation of a wind energy system depends on the wind speed. Wind energy systems have predetermined wind speed threshold values for determining the operational condition of the wind energy system. For instance, one threshold value is the cut-in wind speed which is defined as the wind speed where the wind energy system starts to generate power. Another example is the cut-out speed which is defined as the highest wind speed during which the wind energy system may be operated while delivering power. Normally, generating energy is stopped at wind speeds higher than the cut-out speed.

It is known to provide wind energy systems with a wind speed sensor such as an anemometer for measuring the wind speed. The signal from the anemometer is provided as an input signal for the controller. For instance, functions like the cut-in wind speed and cut-out wind speed are determined on the basis of that anemometer signal. In the event that no anemometer signal can be provided, the wind energy system cannot be operated. Wind energy system availability is therefore affected by the availability of the anemometer signal.

Known anemometers are mounted on the nacelle of the wind energy systems in the wake of the rotor. Hence, the anemometer signal is influenced by the rotor. The influence on the air flow depends on the variety of operational and boundary conditions. It is difficult to correct the signal measured for these conditions. As a result, the readings of the anemometer are highly inaccurate. Further, the anemometer instruments are normally not calibrated individually at each wind energy system which further contributes to the overall uncertainty of the wind speed measurement. As a result of these uncertainties, the threshold values for control decisions based on the anemometer positioned on the nacelle have to be chosen rather conservatively which leads to unnecessary down-times during which the wind energy system could actually be operating within its design limits and produce energy.

BRIEF DESCRIPTION OF THE INVENTION

In view of the above, according to a first aspect, a method for controlling a wind energy system comprising determining the effective wind speed taking into account the load on the rotor blades of said wind energy system exerted by the wind is provided.

According to a further aspect, a computer-readable medium is provided that provides instructions which when executed by a computing platform cause the computing platform to perform operations wherein the operations include the method according to embodiments described herein.

According to a further aspect, a wind energy system having a calculation unit adapted for calculating the effective wind speed by taking into account the load on the rotor blades of said wind energy system exerted by the wind is provided.

According to a further aspect, a wind speed sensor free wind energy system having a generator for generating electric energy and a controller for shutting down and/or starting the electric energy generation in dependence of the wind speed is provided.

Further aspects, advantages and features of the present invention are apparent from the dependent claims, the description and the accompanying drawings.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein:

FIGS. 4A to 4F are embodiments relating to the third operational condition described herein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
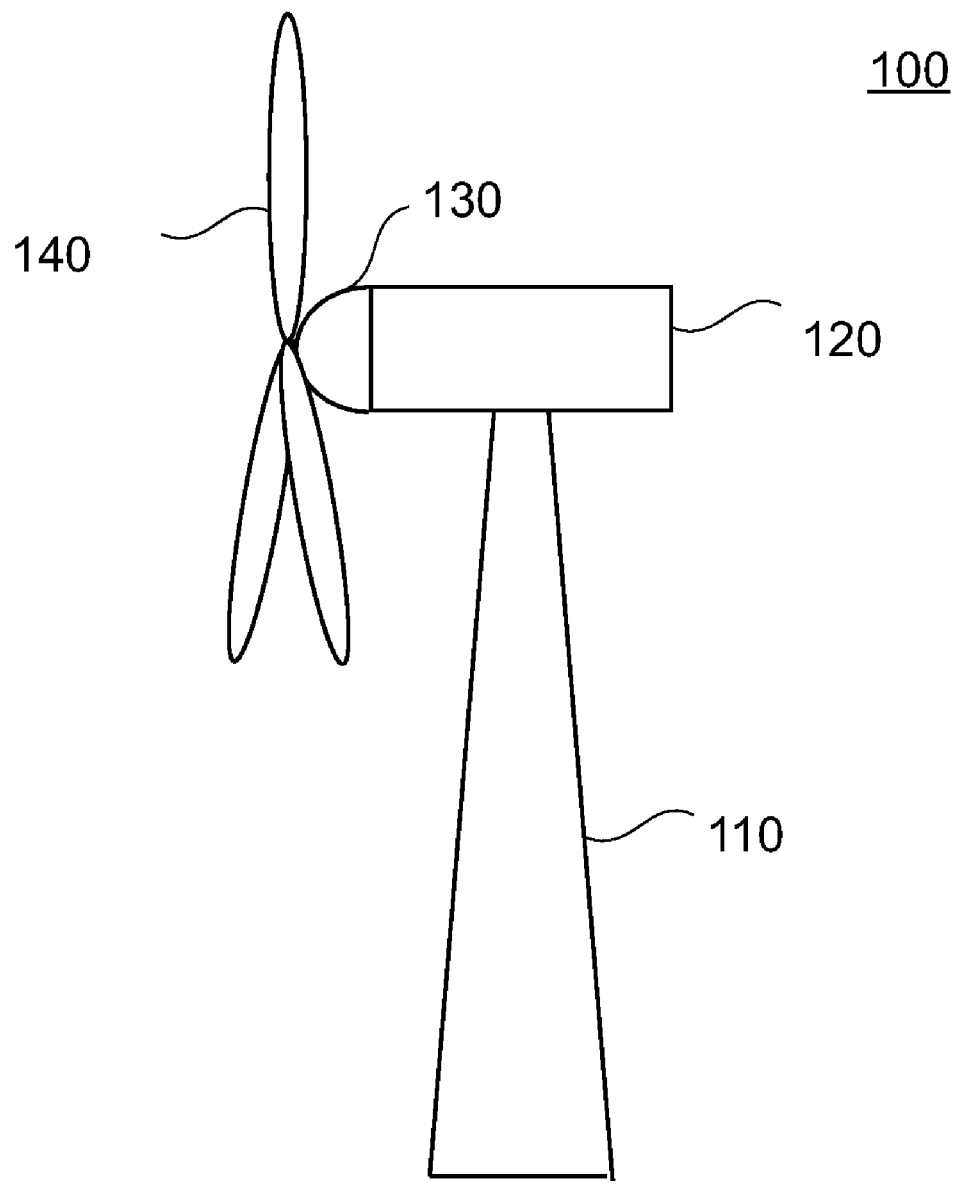
FIG. 1 is a schematic view of a wind energy system according to embodiments described herein.

FIG. 1 is a schematic view of a wind turbine. The wind turbine 100 has a tower 110 to which a machine nacelle 120 is mounted at its top end. The nacelle houses a drive train to which a electric generator is connected (not shown). A hub 130 bearing three rotor blades 140 is mounted to a lateral end of the machine nacelle 120. The rotor blades 140 can be adjusted by pitch drives which are typically accommodated inside hub 130.

In the following, embodiments will be explained with respect to three different operational conditions of the wind energy system. The first operational condition relates to effective wind speeds below the start-up wind speed for the yaw system. The second condition relates to effective wind speeds between start-up wind speed for the yaw system and cut-in wind speed. Further, the second condition relates to effective wind speed higher than the cut-out wind speed. The third condition relates to effective wind speeds between the cut-in wind speed and the cut-out wind speed.

A wind speed sensor as described herein is understood as a unit adapted for measuring the wind speed. More typically, a wind speed sensor as described herein is exclusively adapted for measuring the wind speed. In other words, a wind speed sensor as described herein is not capable of generating consumable energy. Examples of wind speed sensor comprise cup anemometer, heated wire anemometer, ultrasonic anemometer, and the like.

The first operational condition of a wind energy system relates to no wind or very slow wind speed. In particular, it relates to wind speeds below the point where there is sufficient potential in the wind for the wind energy system to command the start-up procedure and start producing net power. In this operational condition, the start wind speed for the yaw system can be determined which is called "start-up wind speed for the yaw system" herein. In the event that the wind exceeds the start-up wind speed for the yaw system, the wind energy system is operated in the second operational condition described in more detail below.

Figure 2:
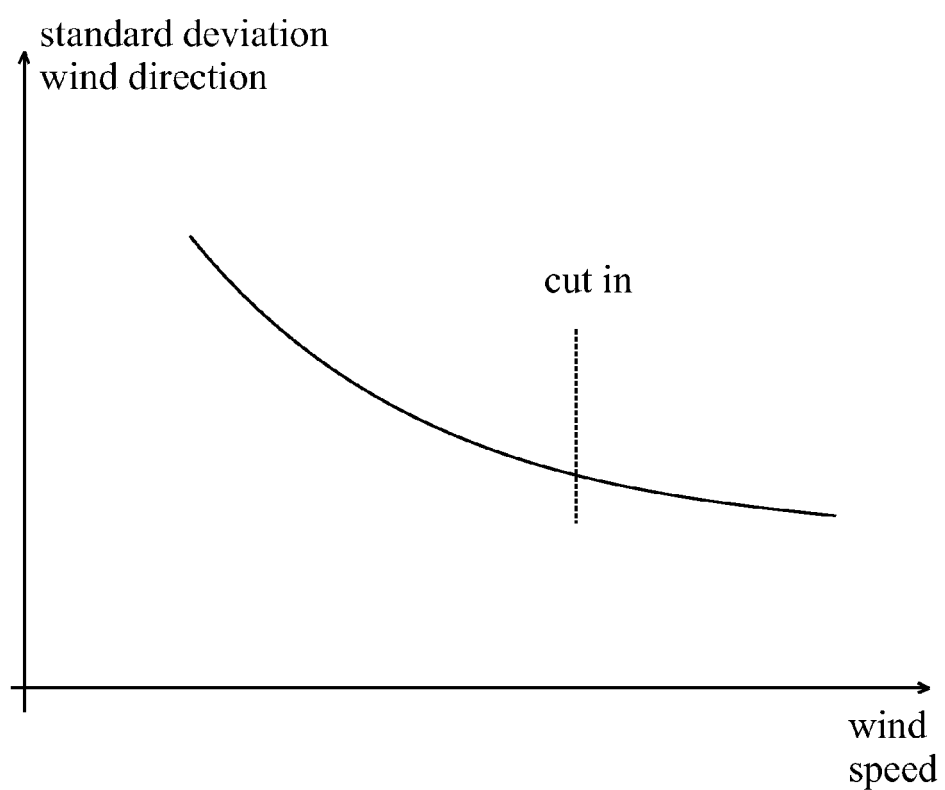
FIG. 2 is a diagram illustrating the dependence of the standard deviation of the wind direction on the wind speed at small wind speed values relating to the first operational condition described herein.

At very low wind speed, i.e. in the first operational condition of the wind energy system, the wind direction signal can be used for the determination of the start-up wind speed for the yaw system. Typically, if the wind speed is close to zero, the wind direction will change with every movement of the air that can e.g. be caused by thermal effects such as convection. The signal will then show frequent changes. This situation is schematically shown in FIG. 2. FIG. 2 is a diagram illustrating an exemplary standard deviation of the wind direction in dependence of the wind speed for low wind speeds. Typically, with very small wind speeds such as in the range of 1 m/sec., the standard deviation of the wind direction is in the range of 30 to 40 degree. With increasing wind speed, the wind direction standard deviation decreases. A typical relation of the wind direction standard deviation and the wind speed as exemplarily shown in FIG. 2 can be given for each site where a wind energy system is installed. It represents the relation between the wind speed and lateral turbulence, expressed by the standard deviation of the wind direction.

Hence, according to embodiments described herein, the start-up wind speed for the yaw system, can be taken from a measurement of the standard deviation of the wind direction. Typically, the site specific relation of the standard deviation of the wind direction and the wind speed is considered.

Thus, according to embodiments described herein, it is not necessary to have an anemometer signal in order to determine the start wind speed for yaw system. Instead, the anemometer signal can be replaced by the calculated effective wind speed which can be derived from the wind direction signal and the calculation of the standard deviation for small wind speeds. Note that the load on the rotor blades at very slow wind speeds is in the range of zero. Therefore, according to embodiments described herein, the load on the wind energy system in the first operational condition can be considered as being zero.

According to embodiments described herein, the yaw of the wind energy system should not follow the measured wind direction as long as the measured standard deviation of the wind direction remains above the respective value of the start-up wind speed for the yaw system threshold value. The more the wind direction standard deviation decreases, the more the wind direction sensor signal stabilizes, and the more the wind speed increases.

In the event that there is no variation in the wind direction at all, the case that there is a high wind speed at a constant direction has to be distinguished from the case that the wind speed is too low to have any influence on the wind direction measurement. In the latter case, the wind speed is too low to overcome the bearing friction of the wind direction sensor. This can be checked by turning the nacelle for some degrees towards one of the two possible directions. If there is enough wind speed to overcome the bearing friction, the direction of the direction sensor should follow the rotation. In the event that the wind direction sensor does not follow the rotational movement of the nacelle, this has to be interpreted as that there is either no wind at all or the wind direction sensor is not operational. Either way, according to embodiments described herein, the wind energy system is not brought into the second operational condition.

The second operational condition is related to idling without grid coupling. Coming from small wind speeds, the second operational condition relates to effective wind speeds above the start-up wind speed for the yaw system and below the cut-in wind speed. As explained in more detail previously, the start-up wind speed for the yaw system is the wind speed above which the wind energy system is operated such that the yaw direction of the nacelle is aligned with the wind direction. The cut-in wind speed as described herein is defined as the wind speed where the wind energy system starts to generate power. Further, the second operational condition relates to effective wind speeds larger than the cut-out wind speed. The second operational condition is, in more basic words, an operational mode where the wind energy system is prepared for generating energy and coupling to the grid.

In order to determine the wind speed during the operational condition, two typical embodiments of determining shall be set forth. According to a first alternative, the wind speed is derived from the rotational speed of the rotor when the pitch angle is kept constant. The effective wind speed is calculated directly from the rotational speed of the rotor which is governed by the pitch angle.

Figure 3A:
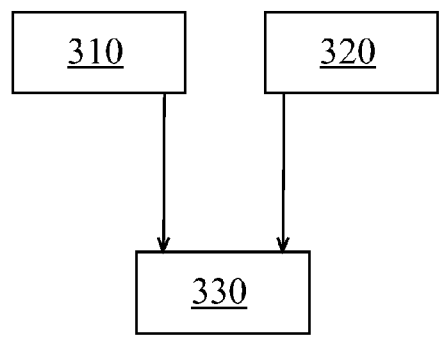
FIGS. 3A to 3C are embodiments relating to the second operational condition described herein.

This method is illustrated in FIG. 3A. The calculation unit 330 for calculating the effective wind speed is informed on the pitch angle of the rotor blades by the pitch drive control 310. As explained previously, the pitch angle does not change according to the method of the first alternative embodiment in the second operation condition. Hence, in typical embodiments, there is no need for a constant information flow from the pitch drive control 310 to the calculation unit 330. Further, the calculation unit 330 constantly receives information from the rotational speed sensor 320 about the actual rotational speed of the rotor. Having the pitch angle and the actual rotational speed of the rotor, the calculation unit is able to calculate the effective wind speed. The term "constantly" as understood herein shall embrace "repeatedly in predetermined time distances".

According to embodiments of the second alternative the wind energy system is operated such that the rotational speed is stabilized at a desired value by constantly adjusting the pitch angle accordingly. The wind speed is then derived from the average pitch angle needed to keep the rotational speed of the rotor constant.

Figure 3B:
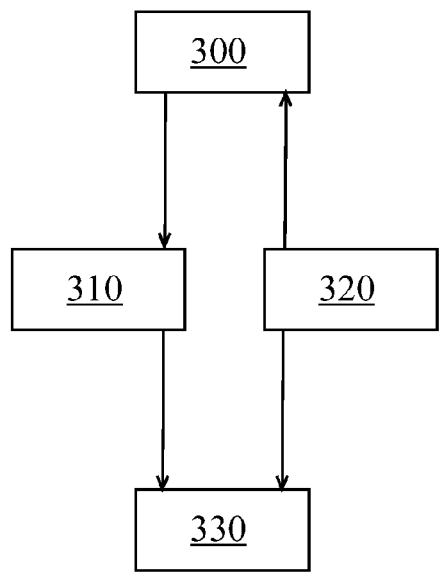

The method of operating the wind energy system according to the second alternative is illustrated in FIG. 3B. The controller 300 is constantly informed on the actual rotational speed of the rotor which is measured by the rotational speed sensor 320. Any change in the rotational speed will cause the controller to change the pitch angle. Therefore, the controller 300 sends constantly information to the pitch drive control 310. For instance, if the rotational speed sensor 320 senses an increase of the rotational speed of the rotor, this information is sent to the controller 300. The controller 300 sends the information to the pitch drive control 310 to feather the rotor blades such that the resulting torque is reduced and the rotational speed is stabilized at the desired wind speed. The calculation unit 330 receives both the information on the actual pitch angle and the actual rotational speed.

Figure 3C:
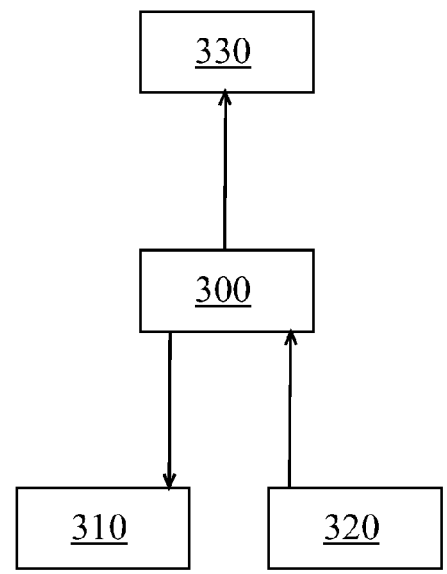

According to the embodiments illustrated with respect to FIGS. 3A and 3B, the information on the actual pitch angle and the actual rotational speed is sent directly to the calculation unit 330 by the pitch drive control 310 and the rotational speed sensor 320. According to different embodiments which can be combined with all other embodiments described herein, the controller 300 is connected to the calculation unit 330, and the information on the pitch angle and the rotational speed is sent from the controller 300 to the calculation unit. This is exemplarily illustrated in FIG. 3C.

According to embodiments described herein, the wind energy system comprises a controller for determining the operational condition of the wind energy system in dependence of the effective wind speed. For instance, if the controller receives the information that the effective wind speed exceeds the start-up wind speed for the yaw system, the controller causes the wind energy system to be operated in the second operational condition. Such a controller can be the controller 300 described in different embodiments herein which can be combined with every embodiment described herein. According to some embodiments described herein, the controller 300 and the calculation unit 330 are physically identical.

The functionality of determining the wind speed without the need for a particular wind speed sensor such as an anemometer during the second operational condition can particularly be used for determining the cut-in wind speed as well as the re-cut-in wind speed. Typically, the re-cut-in wind speed is smaller than the cut-out wind speed, for instance, with a difference of between 1 m/s to 4 m/s, more typically between 2 m/s and 3 m/s. Generally, and not limited to the embodiment described, a mean value of the effective wind speed over time is calculated in order to compare it with the threshold values such as the cut-in wind speed or the re-cut-in wind speed. Typically, the mean value is calculated for a time period of between 5 minutes and 15 minutes such as 10 minutes.

The cut-out wind speed is sometimes also called storm-cut-out wind speed. If the wind speed exceeds the storm-cut-out wind speed, the wind energy system is shut down. Shut down in this context means that the wind energy system stops energy generation and typically changes into the idling mode without grid coupling. During the storm, the rotor blades are idling wherein the pitch angle is typically adjusted such that a small torque is generated. At low wind speed the pitch angle for idling is normally approximately 65°. However, after a storm shut-down it might be necessary to idle the rotor at a higher pitch angle, e.g. between 70° and 80° such as 75° in order to limit the resulting loads. During storm (i.e. after a shut down due to exceeding the cut-out wind speed), the wind energy system can be operated according to embodiments of the method described herein, in particular according to the first or second alternative embodiment of the second operation condition described previously.

The third operational condition relates to normal operation of the wind energy system with grid coupling. Typically, during this condition the yaw direction of the nacelle is constantly aligned with the wind direction. According to typical embodiments described herein, the effective wind speed is calculated from the actual values of the pitch angle of the rotor blades, the rotational speed of the rotor and the torque of the rotor blades. Alternatively or in addition to the torque, values on the generated power can be used.

The pitch angle is only an actuation variable in the so-called standard operation of the wind energy system ensuring to keep the torque and the rotational speed constant. Hence, according to embodiments described herein, as long as the wind energy system is in the standard operational condition, i.e. as long it generates maximum power, the rotational speed and the torque/power generation are almost constant and may be deemed as being constant for the calculation of the effective wind speed. In order to calculate the effective wind speed, it may thus be sufficient to have constantly updated information on the pitch angle of the blades.

FIG. 4A is an exemplary illustration with respect to embodiments for effectively determining the wind speed when the wind energy system is in the third operational condition. The calculation unit 330 receives information signals on the actual pitch angle of the rotor blades from the pitch drive control 310, on the actual rotational speed of the rotor from the rotational speed sensor 320, and on the actual torque value from the torque measuring device 400. The calculation unit 330 is typically adapted for constantly calculating the effective wind speed from this information. Alternatively, or in addition to the torque information, information on the generated power can be used.

According to typical embodiments described herein, the method of operating the wind energy system comprises controlling the operation of the wind energy system according to a pre-determined schedule of torque/power, rotational speed of the rotor and pitch angle of the rotor blades. As the standard operation of the wind energy system according to embodiments described herein is governed by these values, the values typically have to be measured constantly. As explained previously, it may be sufficient to measure the pitch angle only and/or have information on the pitch angle only. For instance, as long as the power generation remains maximally, it may be dispensable to measure the torque and/or the rotational speed constantly. Once the generated power drops, it may be once again necessary to measure values such as the torque, generated power and/or rotational speed. Typically, with changing rotational speed or torque/power values, the pitch angle is adapted to the changed situation. According to typical embodiments, the wind energy system comprises a controller. The controller typically receives measurement values such as the torque value, the power value, the rotational speed value and/or the pitch angle. Typically, the controller constantly controls operational elements of the wind energy system such as the pitch drive in dependence of the values measured.

This situation is exemplarily illustrated in FIG. 4B. Therein, the controller 300 receives information on the actual torque from the torque measuring device 400, on the actual rotational speed of the rotor from the rotational speed sensor 320, and on the actual pitch drive angle from the pitch drive control 310. In dependence on these values and their changes over time, the controller 300 adjusts the pitch angle. This can be done, as it is shown in FIG. 4B, via the pitch drive control 310. The calculation of the effective wind speed is undertaken similarly to the embodiments illustrated with respect to FIG. 4A. Alternatively or in addition, it is possible that the calculation unit 330 is directly connected to the controller 300 in order to get the respective information from the torque measuring device 400, the rotational speed sensor 320, and the pitch drive control 310. The embodiments wherein the calculation unit 330 is exclusively connected to the controller 300 are exemplarily illustrated with respect to FIG. 4C.

Figure 4D:
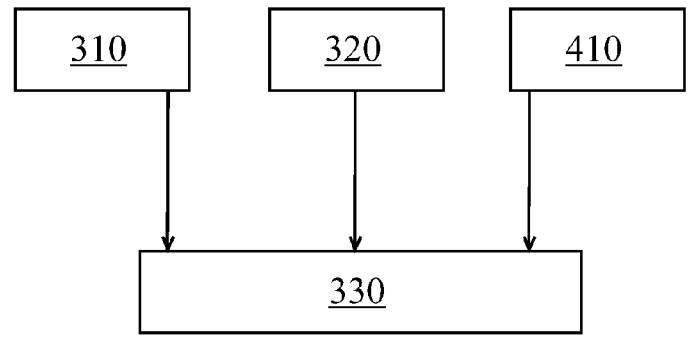
Figures 4E, 4F:
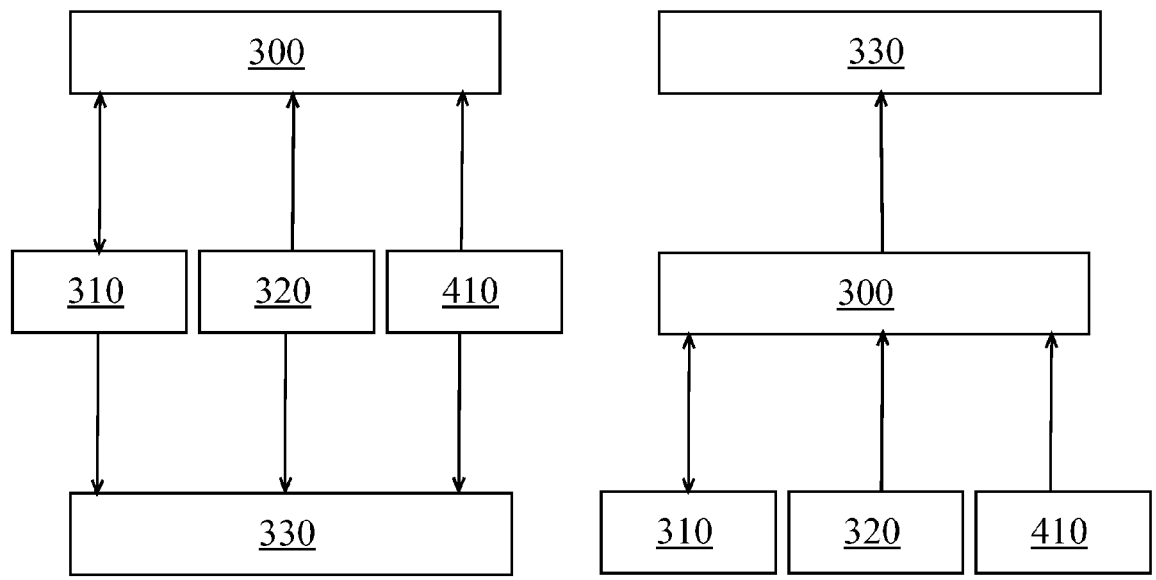

Instead of, or in addition to the torque measuring device 400 of the embodiments shown in FIG. 4A to 4C a power measuring device 410 can be provided. The information from the power measuring device 410 can replace the information on the torque from the torque measuring device 400 in the calculation of the effective wind speed. This is exemplarily illustrated with respect to FIGS. 4D to 4F wherein the torque measuring device 400 is replaced by the power measuring device 410.

According to other embodiments, the information on the generated power is considered in addition to the torque information.

The effective wind speed determination during the third operational condition is typically used for determining the storm-cut-out wind speed and the cut-in wind speed. According to other embodiments, the storm-cut-out wind speed may also be determined by the actual pitch angle of the rotor blades during the third operational condition. According to embodiments as described herein, the cut-in wind speed may be determined by the generated power during the third operational condition. For instance, the wind energy system may be brought into the second operational condition if the generated power becomes negative.

The method of controlling the wind energy system according to embodiments described herein allows the determination of the effective wind speed. According to embodiments described herein, it allows the determination which threshold values are exceeded or under-run by the effective wind speed with the threshold values typically being correlated to the wind speed. Typical threshold values are, for instance, the start-up wind speed for the yaw system, the cut-in wind speed, the cut-out wind speed, and the re-cut-in wind speed.

The "effective wind speed" as described herein specifies the load on the rotor blades exerted by the wind. In other words, the effective wind speed may be understood as a wind speed correlated value that reflects the actual load conditions on the rotor blades. These conditions comprise effects from air density, pressure, temperature, icing, rain, precipitation humidity, and any other effect on the blade airfoil performance. Although the effective wind speed is highly correlated with the actual wind speed, effects on the blade airfoil performance can have an impact on the actual load, on the rotor blades and the whole wind energy system. The "actual wind speed" is, hereto in contrast, the absolute wind speed that is measurable with a standard wind speed sensor such as an anemometer.

The operational control of the wind energy system in dependence on the effective wind speed can be beneficial for all controller decisions with regard to load limitation. This is because the actual load is the limiting factor with respect to the operation of the wind energy system, for example during conditions with wind speeds close to the cut-out wind speed. In other words, the absolute wind speed has been used for the operation of a wind energy system known in the art for the only reason that it is highly correlated to the load on the rotor blades. However, the actual load is better estimated by determining the effective wind speed. The actual load is typically the relevant value for the operation of the wind energy system. The anemometer known in the art measures the wind speed only, whereas the more relevant properties for wind turbine control, like structural loading and power also depend on values such as air density, blade quality, and other conditions. According to typical embodiments of the present invention, these conditions are considered in the calculation of the effective wind speed.

According to typical embodiments described herein, additional wind speed sensors, e.g. for safety reasons, are not necessarily required. The sensors and measurement devices necessary for carrying out the methods according to embodiments described herein are typically already provided with the wind energy system and applied for its operation. Malfunctioning of one of the sensors would already trip the turbine and hence avoid any unsafe events.

According to some embodiments described herein it is possible to provide the wind energy system with an additional wind speed sensor such as an anemometer. For instance, a wind speed sensor may be useful for measuring the absolute wind speed for determining the relation between absolute wind speed and power over time of the wind energy system. This dependence can be used for both economic and technical analysis. For instance, if this dependence is extra-ordinarily poor, this indicates that something is not working properly in the wind energy system.

The advantages of the embodiments described are manifold. The storm-cut-out wind speed may be determined on the basis of sensor signals that more closely reflect the more relevant turbine loading and power output rather than the absolute wind speed only which is measured by a wind speed sensor. This leads to a higher cut-out wind speed at sites and/or weather conditions with low air density. Without violating the load envelope, the energy capture is thereby increased.

Further, according to typical embodiments, one sensor can be saved from the standard wind energy system configuration. Apart from the cost out effect this may also have a positive impact on the wind energy system availability because a wind speed sensor failure in wind energy systems known normally trips the wind energy system and leads to down time of the wind energy system. Nevertheless, according to some embodiments described herein, an anemometer can be provided with the wind energy system for other purposes than wind energy system control such as power performance monitoring, icing detection, etc.

According to embodiments described herein, a computer-readable medium is provided. On the computer-readable medium instructions are provided which, when executed by a computing platform, cause the computing platform to perform method operations according to the method embodiments described herein. In particular, the instructions may comprise the determination of the effective wind speed taking into account the load on the rotor blades of said wind energy system exerted by the wind. The effective wind speed can be determined according to the embodiments described previously. Further, the instructions may comprise the determination of the operational condition of the wind energy system in dependence of the effective wind speed. A computer-readable medium according to embodiments described herein can be a memory stick, a hard disk, a diskette, or the like.

According to typical embodiments described herein, the effective wind speed is derived from the variation of the wind direction. This is typically done without the information from a wind speed sensor. The wind energy system according to embodiments described herein comprises typically a pitch drive control for controlling the pitch angle of the rotor blades and a rotational speed sensor for measuring the rotational speed of the rotor wherein the calculation unit is connected to the pitch drive control and the rotational speed sensor. According to yet further embodiments the wind energy system comprises a torque measuring device for measuring the torque of the rotor wherein the calculation unit is connected to the torque measuring device. Alternatively or in addition, the wind energy system comprises a generator for transforming the wind energy in electric energy and a power measuring device for measuring the generated power wherein the calculation unit is connected to the power measuring device.

In general, the calculation unit of the wind energy system according to many embodiments is not adapted for receiving signals from a wind speed sensor. More typically, the wind energy system is a wind speed sensor free wind energy system.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for controlling a wind energy system, the wind energy system comprising a rotor, said method comprising:
   determining an effective wind speed incident on the rotor, taking into account load on the rotor exerted by wind; and
   determining an operational condition of the wind energy system based on the effective wind speed,
   wherein the effective wind speed is calculated from a rotational speed of the rotor, a pitch angle of a rotor blade of the rotor and at least one of a generated power of the wind energy system and a torque of the rotor, for wind speeds in a range between a cut-in wind speed for the wind energy system and a cut-out wind speed for the wind energy system.

2. The method according to claim 1 wherein the determining the effective wind speed incident on the rotor takes into account effects of at least one of air density, temperature, pressure, icing, rain, precipitation, and humidity.

3. The method according to claim 1 wherein said effective wind speed is calculated from the rotational speed of the rotor and the pitch angle of the rotor blade of the rotor for wind speeds in a range between a start-up wind speed for a yaw system of the wind energy system and the cut-in wind speed for the wind energy system, and for wind speeds in a range above the cut-out wind speed for the wind energy system.

4. The method according to claim 1 wherein said effective wind speed is calculated from both the generated power of the wind energy system and the torque of the rotor.

5. The method according to claim 3 wherein said effective wind speed is calculated from a variation of the wind direction for wind speeds in a range below the start-up wind speed for the yaw system of the wind energy system.

6. The method according to claim 1 wherein said determining said effective wind speed is undertaken without using information from a wind speed sensor.

7. A computer-readable medium storing data corresponding to instructions which when executed by a computing platform cause said computing platform to perform operations, said operations comprising the method according to claim 1.

8. A wind energy system comprising:
   a rotor with rotor blades;
   a controller;
   a calculation unit in communication with the controller and configured to calculate an effective wind speed incident on the rotor by taking into account load on the rotor exerted by wind,
   wherein the controller determines an operational condition of the wind energy system based on the effective wind speed,
   a pitch drive control for controlling the pitch angle of the rotor blades; and
   a rotational speed sensor for measuring the rotational speed of the rotor,
   wherein said calculation unit is in communication with said pitch drive control and said rotational speed sensor, and
   wherein the effective wind speed is calculated from the rotational speed of the rotor and the pitch angle of the rotor blades for wind speeds in a range between a start-up wind speed for a yaw system of the wind energy system and a cut-in wind speed for the wind energy system, and for wind speeds in a range above a cut-out wind speed for the wind energy system.

9. The wind energy system according to claim 8 wherein the effective wind speed is calculated from a rotational speed of the rotor, a pitch angle of the rotor blades, and a torque of the rotor, for wind speeds in a range between the cut-in wind speed for the wind energy system and the cut-out wind speed for the wind energy system.

10. The wind energy system according to claim 8, further comprising:
    a torque measuring device for measuring the torque of the rotor; and
    wherein said calculation unit is in communication with said torque measuring device.

11. The wind energy system according to claim 9, further comprising:
    a generator for transforming wind energy in electric energy;
    a power measuring device for measuring generated electric energy, the power measuring device being in communication with the calculation unit; and
    wherein the generated electric energy is used to calculate the effective wind speed alternatively or in addition to the torque of the rotor.

12. The wind energy system according to claim 8 wherein the calculation unit is not configured to receive signals from a wind speed sensor.

13. The wind energy system according to claim 8 wherein the effective wind speed is calculated without using information from a wind speed sensor.

14. The wind energy system according to claim 8 wherein the effective wind speed is calculated from a variation of wind direction for wind speeds in a range below the start-up wind speed for the yaw system of the wind energy system.

15. The method according to claim 3 wherein the effective wind speed is calculated from the rotational speed of the rotor when the pitch angle of the blade of the rotor remains constant, for wind speeds in the range between the start-up wind speed for the yaw system of the wind energy system and the cut-in wind speed for the wind energy system, and in the range above the cut-out wind speed for the wind energy system.

16. The method according to claim 3 wherein the effective wind speed is calculated from an average pitch angle of the blade of the rotor when the rotational speed of the rotor remains constant, for wind speeds in the range between the start-up wind speed for the yaw system of the wind energy system and the cut-in wind speed for the wind energy system, and in the range above the cut-out wind speed for the wind energy system.

* * * * *